(12) United States Patent
Airoldi et al.

(10) Patent No.: US 9,490,672 B2
(45) Date of Patent: Nov. 8, 2016

(54) MAGNET COMPONENT WITH A THERMAL INSULATION STRUCTURE, ROTOR ASSEMBLY WITH SUCH A MAGNET COMPONENT, ELECTROMECHANICAL TRANSDUCER AND WIND TURBINE

(71) Applicant: SIEMENS AKTIENGESELLSCHAFT, München (DE)

(72) Inventors: Giovanni Airoldi, Vejle (DK); Peter Hessellund Soerensen, Brædstrup (DK); Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 342 days.

(21) Appl. No.: 13/850,359

(22) Filed: Mar. 26, 2013

(65) Prior Publication Data

US 2013/0249341 A1 Sep. 26, 2013

(30) Foreign Application Priority Data

Mar. 26, 2012 (EP) .................................... 12161282

(51) Int. Cl.
*H02K 1/27* (2006.01)
*H02K 1/04* (2006.01)
*H02K 5/128* (2006.01)
*H02K 7/18* (2006.01)

(52) U.S. Cl.
CPC ................ *H02K 1/27* (2013.01); *H02K 1/278* (2013.01); *H02K 5/128* (2013.01); *H02K 1/04* (2013.01); *H02K 7/1838* (2013.01); *H02K 2201/03* (2013.01); *H02K 2213/12* (2013.01); *Y02E 10/725* (2013.01)

(58) Field of Classification Search
CPC .......... H02K 1/04; H02K 1/27; H02K 1/278; H02K 1/28; H02K 2201/03; H02K 2213/12; H02K 5/128; H02K 7/183; H02K 7/1838; Y02E 10/725
USPC ..................................................... 310/156.27
See application file for complete search history.

(56) References Cited

U.S. PATENT DOCUMENTS

| | | | | |
|---|---|---|---|---|
| 4,678,954 A | * | 7/1987 | Takeda et al. | 310/156.27 |
| 5,160,911 A | * | 11/1992 | Herring | 335/216 |
| 5,402,025 A | * | 3/1995 | Saito et al. | 310/156.27 |
| 5,801,470 A | * | 9/1998 | Johnson et al. | 310/156.27 |
| 6,331,214 B1 | * | 12/2001 | Koga et al. | 148/101 |
| 6,380,833 B1 | * | 4/2002 | Nguyen et al. | 335/301 |
| 7,053,508 B2 | * | 5/2006 | Kusase et al. | 310/64 |
| 7,812,495 B2 | * | 10/2010 | Shiao et al. | 310/156.22 |

(Continued)

FOREIGN PATENT DOCUMENTS

| | | |
|---|---|---|
| CN | 101263650 A | 9/2008 |
| CN | 101294549 A | 10/2008 |
| CN | 101355277 A | 1/2009 |
| CN | 102057229 A | 5/2011 |

(Continued)

*Primary Examiner* — Alex W Mok

(57) ABSTRACT

A magnet assembly for a rotor assembly of an electromechanical transducer includes a magnet component and a thermal insulating structure. The magnet component has a permanent magnet material. The thermal insulation structure covers at least a part of a surface of the magnet component for thermally decoupling the magnet component from heat being generated within electromechanical transducer. In an example embodiment, the electromechanical transducer is a generator of a wind turbine.

10 Claims, 3 Drawing Sheets

(56) References Cited

U.S. PATENT DOCUMENTS

| | | | |
|---|---|---|---|
| 7,836,575 B2* | 11/2010 | Groendahl et al. | 29/596 |
| 2005/0040721 A1 | 2/2005 | Kusase et al. | |
| 2009/0256433 A1* | 10/2009 | Stiesdal | 310/54 |
| 2010/0194226 A1 | 8/2010 | Metzner et al. | |
| 2010/0253930 A1* | 10/2010 | Ito | 355/72 |
| 2011/0043065 A1* | 2/2011 | Piercey et al. | 310/156.12 |
| 2011/0083467 A1* | 4/2011 | Asano et al. | 62/498 |

FOREIGN PATENT DOCUMENTS

| | | |
|---|---|---|
| CN | 102362410 A | 2/2012 |
| DE | 102010023878 A1 | 12/2011 |
| JP | 2005218274 A | 8/2005 |
| JP | 2006304547 A | 11/2006 |
| JP | 2008125242 A | 5/2008 |
| WO | WO 2008046780 A2 | 4/2008 |
| WO | WO 2010109056 A1 | 9/2010 |

* cited by examiner

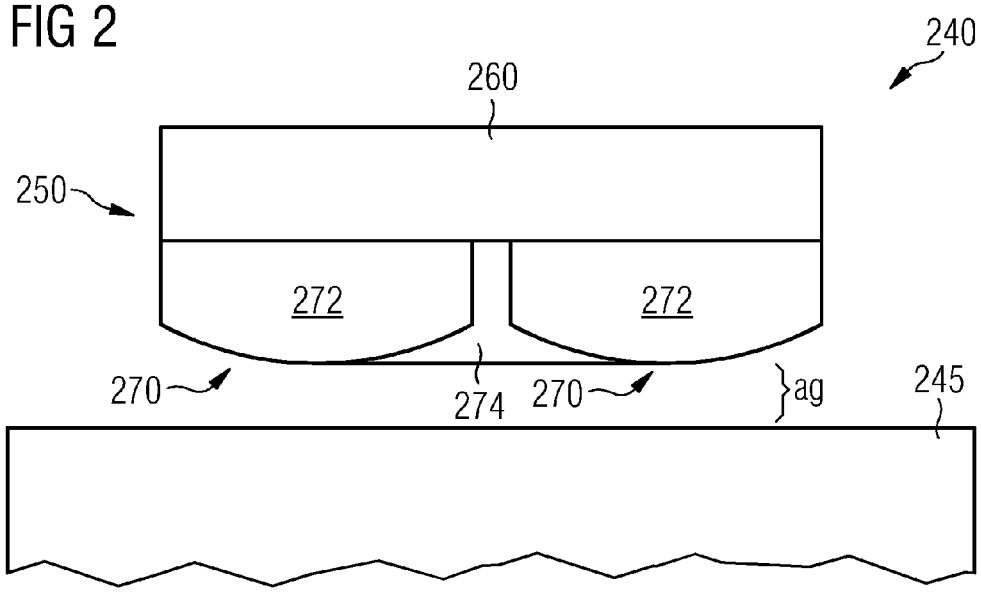
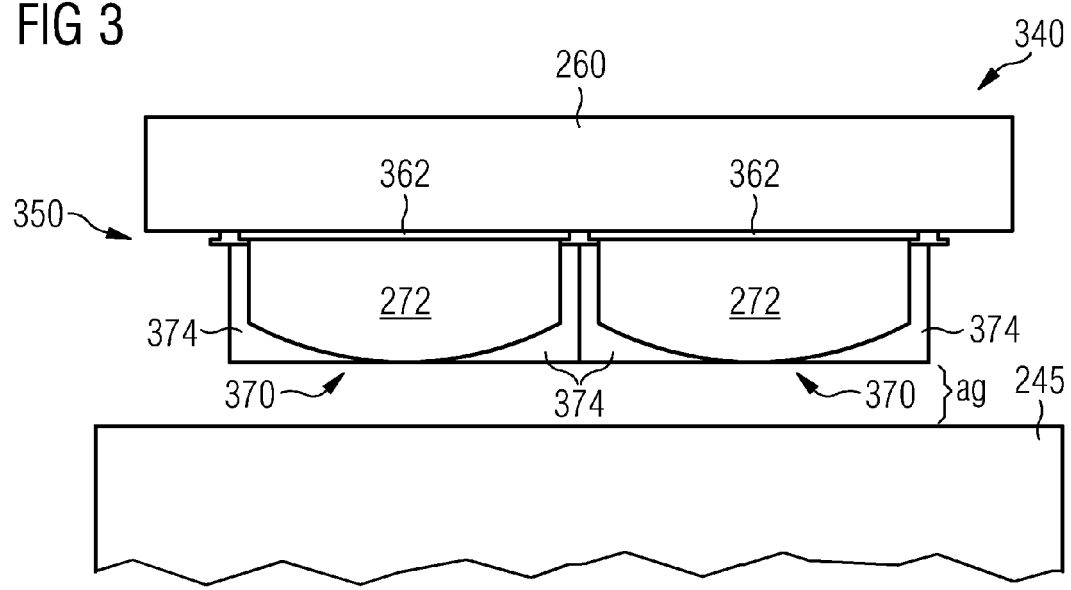

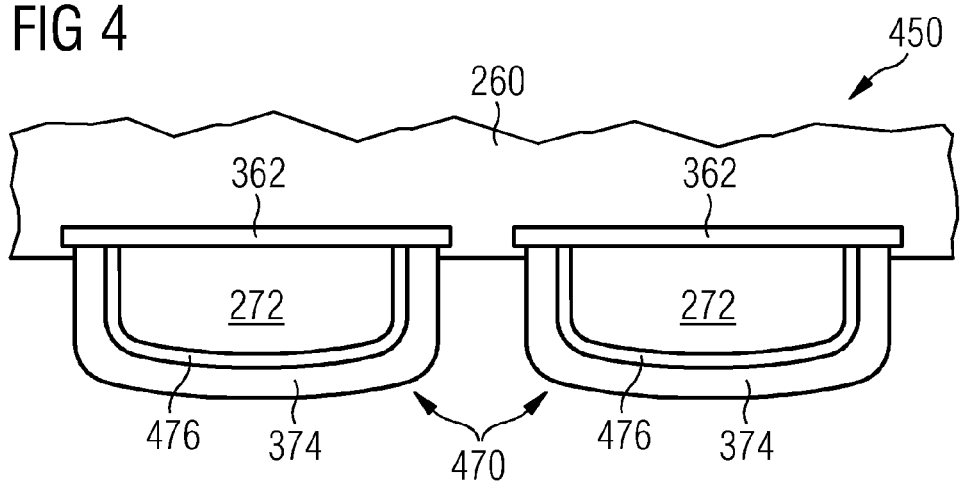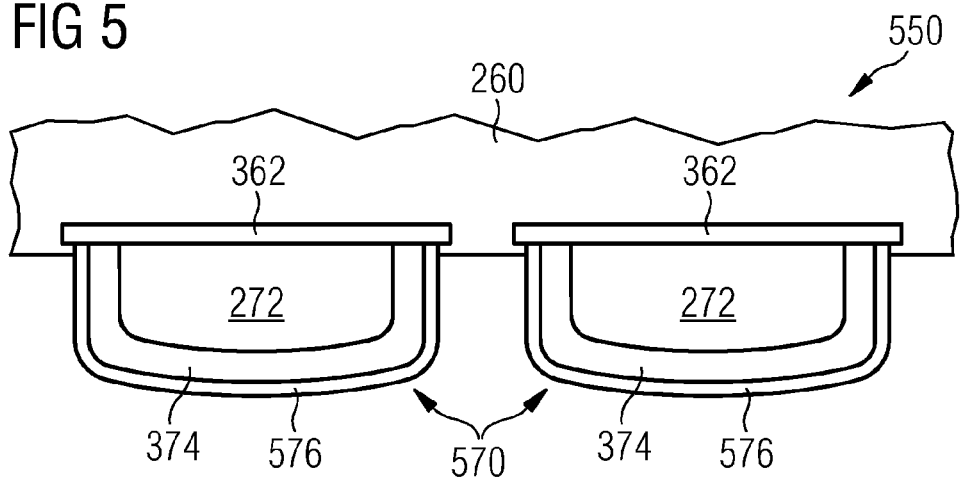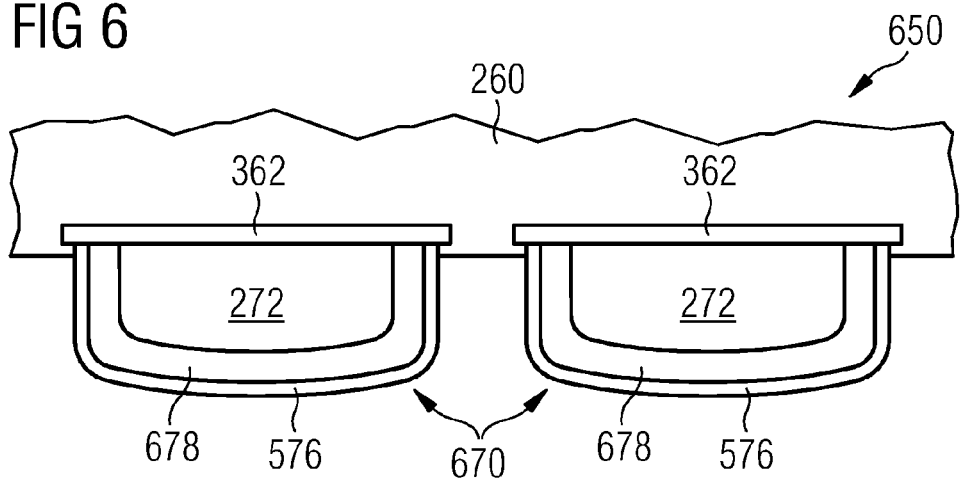

MAGNET COMPONENT WITH A THERMAL INSULATION STRUCTURE, ROTOR ASSEMBLY WITH SUCH A MAGNET COMPONENT, ELECTROMECHANICAL TRANSDUCER AND WIND TURBINE

CROSS REFERENCE TO RELATED APPLICATIONS

This application claims priority of European Patent Office application No. 12161282.4 EP filed Mar. 26, 2012. All of the applications are incorporated by reference herein in their entirety.

FIELD OF INVENTION

Embodiments herein relate to the technical field of electromechanical transducers having a rotor assembly which comprises permanent magnets. In particular, the embodiments relate to a magnet assembly for a rotor assembly of an electromechanical transducer. Further, the embodiments also to a rotor assembly, to an electromechanical transducer and to a wind turbine, which are all equipped with at least one of such magnet assembly.

BACKGROUND OF INVENTION

Electromechanical transducers are machines, which convert electrical energy into mechanical energy or vice versa. An electric motor is a widely used electromechanical transducer that converts electrical energy into mechanical energy using magnetic field linkage. An electric generator is an electromechanical transducer that converts mechanical energy into electrical energy also using a magnetic field linkage.

An electromechanical transducer comprises a stator and a rotor. The stator is an assembly, which represents the stationary part of an electromechanical transducer. The rotor is an assembly, which represents the moving part of an electromechanical transducer. The above mentioned magnetic field linkage couples the stator with the rotor.

In recent years, especially since the introduction of rare-earth magnetic materials, permanent magnet (PM) electromechanical transducers have become popular since they eliminate the need for commutators and brushes, which are commonly used with conventional Direct Current electromechanical transducer. The absence of an external electrical rotor excitation eliminates losses on the rotor and makes PM electromechanical transducers more efficient. Further, the brushless design of a PM electromechanical transducer allows conductor coils to be located exclusively in the stationary stator. In this respect it is mentioned that non-PM electromechanical transducers, which are equipped with commutators and brushes, are susceptible to significantly higher maintenance costs.

PM electromechanical transducers are also known for their durability, controllability, and absence of electrical sparking. Thanks to their advantages PM electromechanical transducers are widely used in many applications such as electric vehicles (i.e. the electromechanical transducer is a motor) or in power generation systems (i.e. the electromechanical transducer is a generator) such as for instance in wind turbines. PM electromechanical transducers are used in particular in so called Direct Drive (DD) wind turbines, wherein the generator is directly connected via a main shaft to (a hub of) a rotor of the respective DD wind turbine.

One known technical problem of PM electromechanical transducers is thermal load acting on the respective permanent magnet material. Specifically, waste heat being generated by stator coils of a stator of a PM electromechanical transducer can cause the PM material to be heated up such that there is a serious risk of a demagnetization of the PM material. Such a demagnetization would dramatically decrease the performance of the respective electromechanical transducer.

It is known to use an air gap between the stator and the rotor of an electromechanical transducer as a cooling duct, through which a cooling fluid is guided in order to remove the waste heat generated by the stator coils. The cooling fluid, which may be e.g. air, can be driven along the air gap by means of a natural convection through the PM electromechanical transducer.

SUMMARY OF INVENTION

There may be a need for increasing the thermal load capability of a PM electromechanical transducer.

This need may be met by the subject matter according to the independent claims Specific embodiments are described by the dependent claims.

According to a first aspect, there is described a magnet assembly for a rotor assembly of an electromechanical transducer, in particular for a rotor assembly of a generator of a wind turbine. The described magnet assembly comprises (a) a magnet component comprising a permanent magnet material, and (b) a thermal insulation structure covering at least a part of a surface of the magnet component for thermally decoupling the magnet component from heat being generated within electromechanical transducer.

The described magnet assembly is based on the idea that the permanent magnet material of a magnet component can be effectively protected from heat by means of a thermal isolation structure, which covers at least partially the magnet component. By means of this measure, during an operation of the electromechanical transducer, the permanent magnet material can be effectively protected from heat.

The thermal insulation structure may be any physical structure and/or may comprise any physical material, which are capable of impeding at least partially a heat transfer from the interior of the electromechanical transducer into the permanent magnet material. Specifically, the thermal insulation structure may allow for impeding (a) a thermal radiation e.g. by means of a reflection of the corresponding infrared radiation, and/or (b) a thermal conduction between a medium surrounding the magnet assembly, e.g. a cooling fluid, and the magnet component.

In particular, the permanent magnet material can be protected from heat being generated by stator coils of a stator of the electromechanical transducer. Thereby, the heat transfer from the heat generating stator coils to the magnet component(s) can be based on thermal radiation and thermal conduction. Typically, thermal conduction provides the larger fraction to the total heat transfer between the stator coils and the corresponding magnet component. This holds in particular for those applications where a cooling fluid streaming through an air gap between the rotor and the stator is used for cooling the stator coils.

The described thermal insulation of the magnet component may provide the technical effect that during an operation the permanent magnet material can be kept comparatively cool. This has the effect that compared to known magnet assemblies a less temperature sustaining and also cheaper material can be used for the described permanent magnet material. In case of a rare earth material being used for the permanent magnet material a material composition can be employed which comprises a smaller amount of rare earth material such as e.g. dysprosium.

In this respect it is mentioned that it is not necessary that the concentration of a rare earth metal such as dysprosium within the permanent magnet material a material composition is spatially constant. For instance, when taking into account potential temperature gradients within the permanent magnet material it is possible to use an non-uniform concentration of dysprosium wherein the concentration of dysprosium decreases in a radial direction from the stator side to the rotor support assembly.

Further, by keeping the temperature of the permanent magnet material comparatively cool even in extreme operational ranges, the risk of an unwanted demagnetization of the magnet component can be effectively reduced. Furthermore, also the overall magnetic performance of the magnet assembly and, as a consequence, also the performance of the whole electromechanical transducer can be increased by keeping the temperature of the permanent magnet material comparatively cool.

The magnet assembly may be handled during a manufacturing process of the rotor assembly as a modular unit, which together with other corresponding modular magnet assemblies is mounted to a support structure of the assembly unit. Alternatively, the magnet assembly may be part of a larger unit. Specifically, this may mean that one insulation structure is used for at least two magnet components, which are commonly mounted to a support structure of the assembly unit. Thereby, it may be desirable first to mount the magnet components to the support structure and second to attach the thermal insulation structure such that the surfaces of the at least two magnet components are at least partially covered by the thermal insulation structure. Thereby, in order not to decrease an air gap between the rotor assembly and a stator assembly of an electromechanical transducer it may be advantageous to locate the thermal insulation structure in between the at least two magnet components being spatially spaced apart from each other. This may be in particular advantageous if such an air gap is used for streaming a cooling fluid in order to cool stator coils.

According to an embodiment, the magnet assembly further comprises a base element having (a) a front surface being attached to the magnet component surface, and (b) a back surface for mounting the magnet assembly to a support structure of the rotor assembly.

The described support element may be a base plate which allows for an effective mounting or fastening of the magnet assembly to a support structure of a rotor assembly.

The mounting can be realized by means of any fastening technique, e.g. a chemical fastening technique such as gluing and/or a mechanical fastening technique such as e.g. screwing, clamping, engaging, welding, encasing etc. An engaging may be realized e.g. by means of any three dimensional contours. Thereby, a first contour (e.g. the surface of an undercut) is formed at one of the base element and the support structure and a complementary contour (e.g. a surface of an engagement element) is formed at the other one of the base element and the support structure of the rotor assembly.

According to a further embodiment, the thermal insulating structure comprises a thermal insulating material. The thermal insulating material may be any material which provides for an impediment of a thermal conductance into the permanent magnet material of the magnet component.

According to a further embodiment, the thermal insulating structure comprises a sandwich structure of at least one layer of a thermal insulating material and at least one layer of a thermal radiation reflecting material.

The thermal radiation reflecting material may be any material, which will at least to a significant extend of e.g. 80% reflect thermal radiation. In particular, the thermal radiation reflecting material should be capable to reflect infrared electromagnetic radiation.

The thermal insulating material of the sandwich structure may comprise the same properties as the thermal insulating material described above.

In this respect it is mentioned that in typical use cases, in particular when using a so called direct drive generator wind turbine wherein the rotor of the wind turbine is directly connected to a hub through a bearing, the main cause for heating up the magnet component is convective heating caused by a flow of hot air through the air gap. Typically, thermal radiation contributes only in a minor manner.

According to a further embodiment, the thermal insulating material is a porous material. Thereby, a plurality of air pockets with entrapped air may cause on the one hand a small thermal conductance and on the other hand a small weight. For instance a small weight has the advantage that the mass of a rotor of an electromechanical transducer can be kept within acceptable limits.

According to a further embodiment, the thermal insulating material comprises at least one of the group consisting of polyurethane foam, phenol foam, aerogel, mineral wool, glass wool, silica lime sand brick and clay. All these material provide the advantage that (a) they are cheap, (b) they have good thermal insulation properties and (c) they have a comparatively small weight.

At this point it is mentioned that the above mentioned list is not exclusive. There are of cause countless other types of materials which could be used as the thermal insulating material.

According to a further embodiment, the thermal insulation structure comprises an enclosure structure surrounding at least the magnet component.

The enclosure structure may be any mechanical structure which provides for the enclosed components at least some mechanical stability and/or protection from (unwanted) environmental impacts or actions. Specifically, the enclosure structure may be realized by means of a metal cover.

The enclosure structure may comprise a highly resistant material such as for instance a certain plastic material, stainless steel or Teflon.

According to a further embodiment, the enclosure structure spatially separates the magnet component from the thermal insulating structure. This may provide the benefit that the magnet component can be effectively protected from external impacts.

This may hold not only for the impacts which may occur during an operation of the electromechanical transducer but also during an manufacturing process wherein the thermal insulation structure is attached to the enclosure structure and not directly to the magnet component respectively the permanent magnet material.

The enclosure structure may be for instance a housing for the magnet component respectively the permanent magnet material.

According to a further embodiment, the enclosure structure encloses both the magnet component and the thermal insulating material. This may provide the benefit that the whole magnet assembly can be effectively protected from external impacts. Again, the enclosure structure may be regarded as a housing for the magnet assembly, which can, as has been already mentioned above, be handled as a modular unit for building up a rotor assembly.

According to a further embodiment, there is formed a free space between the enclosure structure and the magnet component. This may provide the benefit that a very good thermal insulation can be provided because the heat conductivity via the free space is typically very small. A vacuum or at least an underpressure or a negative pressure may be provided within the free space. Further, the free space may be filled with a gas which comprises a small heat conductivity. Also such a gas may be filled in the free space with a negative pressure.

According to a further aspect, there is described a rotor assembly for an electromechanical transducer, in particular for a rotor assembly of a generator of a wind turbine. The described rotor assembly comprises (a) a support structure, and (b) at least one magnet assembly as described above. The back surface of the at least one magnet assembly is mounted to the support structure.

The described rotor assembly is based on the idea that with the above described magnet assembly a rotor assembly for an electromechanical transducer can be built up, which allows to design a permanent magnet (PM) electromechanical transducer having a large thermal load carrying capacity.

The mentioned support structure may be realized for instance by a so called rotor housing which, when being installed in a PM electromechanical transducer, is rotatable around a rotational axis of the PM electromechanical transducer.

According to an embodiment, the rotor assembly further comprises at least one further magnet assembly as described above, wherein the magnet assembly and the further magnet assembly are mounted next to each other at the support structure, wherein the thermal insulation structure is a common thermal insulation structure both for the magnet assembly and the further magnet assembly, and wherein the thermal insulation structure is located exclusively in between a space between the magnet assembly and the further magnet assembly. This may provide the benefit that an air gap between the rotor assembly and a stator assembly of an electromechanical transducer is not automatically reduced such that a cooling fluid, which is streaming along the air gap, is not spatially constricted by the thermal insulation structure. As a consequence, the cooling capability for the stator coils will not be reduced such that the overall thermal load capability of the electromechanical transducer will be increased as compared to the overall thermal load capabilities of known electromechanical transducers.

According to a further aspect, there is described an electromechanical transducer, in particular a generator of a wind turbine. The described electromechanical transducer comprises (a) a stator assembly, and (b) a rotor assembly as described above.

The described electromechanical transducer is based on the idea that with the above described rotor assembly one can design a PM electromechanical transducer which comprises an increased overall thermal load capability. This has the effect that the described electromechanical transducer can be operated in more extreme (temperature) conditions and/or with a higher performance It is mentioned that the provided electromechanical transducer may be realized with different designs. A common design option is characterized by the matter of fact that the rotor assembly is located within the stator assembly. A less common design option is characterized by the matter of fact that the rotor assembly is located outside from the stator assembly. In the latter option during operation of the PM electromechanical transducer the magnetic flux interacting between the stator coils and the magnet components parts may be directed radially outwards from the stator.

According to a further aspect, there is described a wind turbine for generating electrical power. The described the wind turbine comprises (a) a tower, (b) a rotor, which is arranged at a top portion of the tower and which comprises at least one blade, and (c) an electromechanical transducer as set forth in the preceding claim, wherein the electromechanical transducer is mechanically coupled with the rotor.

The described wind turbine is based on the idea that the above described electromechanical transducer representing a generator for the wind turbine may allow for increasing the efficiency of an electricity generation by the wind turbine.

It has to be noted that embodiments have been described with reference to different subject matters. However, a person skilled in the art will gather from the above and the following description that, unless other notified, in addition to any combination of features belonging to one type of subject matter also any combination between features relating to different subject matters is considered as to be disclosed within this document.

The aspects defined above and further aspects are apparent from the examples of embodiment to be described hereinafter and are explained with reference to the examples of embodiment. Embodiments will be described in more detail hereinafter with reference to examples.

BRIEF DESCRIPTION OF THE DRAWINGS

FIG. 2 shows an electromechanical transducer comprising a rotor assembly wherein a free space between two neighboring magnet assemblies is filled with a thermal insulation material, FIG. 3 shows an electromechanical transducer comprising a rotor assembly with two magnet assemblies each being realized as a modular unit comprising a magnet component and a thermal insulation material.

FIG. 4 shows a rotor assembly being equipped with modular magnet assemblies, wherein in each modular magnet assembly an enclosure is arranged between a permanent magnet material and a thermal insulation material.

FIG. 5 shows a rotor assembly being equipped with modular magnet assemblies, wherein in each modular magnet assembly an enclosure surrounds both a permanent magnet material and a thermal insulation material.

FIG. 6 shows a rotor assembly being equipped with modular magnet assemblies, wherein in each modular magnet assembly a free space with vacuum or a negative pressure is provided between a permanent magnet material and an enclosure.

DETAILED DESCRIPTION OF INVENTION

Figure 1:
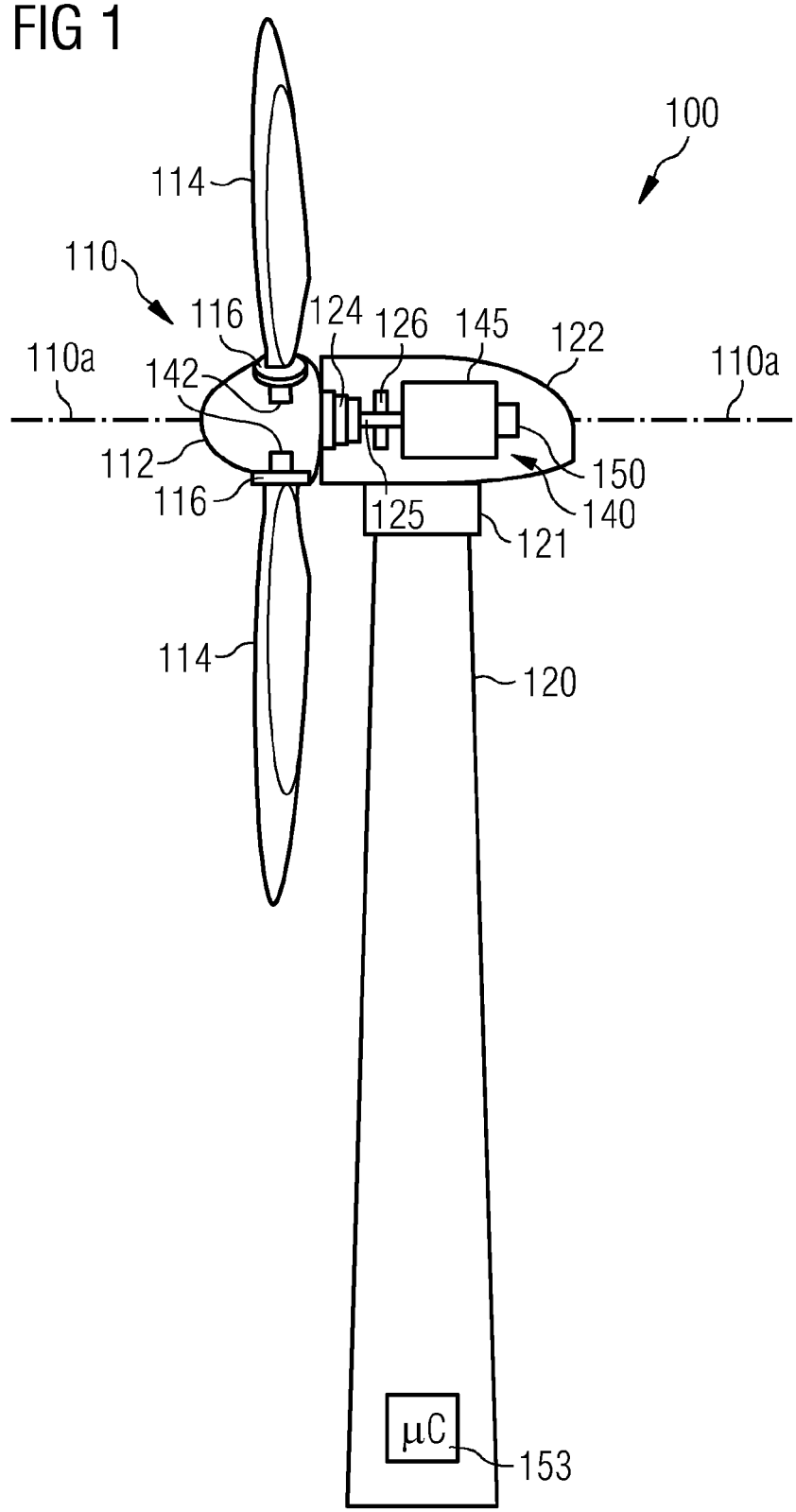
FIG. 1 shows a wind turbine according to an embodiment.

The illustration in the drawing is schematically. It is noted that in different figures, similar or identical elements are provided with the same reference signs or with reference signs, which are different from the corresponding reference signs only within the first digit.

FIG. 1 shows a wind turbine 100 according to an embodiment. The wind turbine 100 comprises a tower 120 which is mounted on a non-depicted fundament. On top of the tower 120 there is arranged a nacelle 122. In between the tower 120 and the nacelle 122 there is provided a yaw angle adjustment device 121 which is capable of rotating the nacelle 122 around a non depicted vertical axis being aligned with the longitudinal extension of the tower 120. By controlling the yaw angle adjustment device 121 in an appropriate manner it can be made sure that during a normal operation of the wind turbine 100 the nacelle 122 is always properly aligned with the current wind direction. However, the yaw angle adjustment device 121 can also be used to adjust the yaw angle to a position, wherein the nacelle 122 is intentionally not perfectly aligned with the current wind direction.

The wind turbine 100 further comprises a rotor 110 having three blades 114. In the perspective of FIG. 1 only two blades 114 are visible. The rotor 110 is rotatable around a rotational axis 110*a*. The blades 114, which are mounted at a hub 112, extend radially with respect to the rotational axis 110*a*.

In between the hub 112 and a blade 114 there is respectively provided a blade adjustment device 116 in order to adjust the blade pitch angle of each blade 114 by rotating the respective blade 114 around a non depicted axis being aligned substantially parallel with the longitudinal extension of the respective blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, in which only a reduced wind power can be captured.

As can be seen from FIG. 1, within the nacelle 122 there is provided a gear box 124. The gear box 124 is used to convert the number of revolutions of the rotor 110 into a higher number of revolutions of a shaft 125, which is coupled in a known manner to an electromechanical transducer 140. The electromechanical transducer is a generator 140.

At this point it is mentioned that the gear box 124 is optional and that the generator 140 may also be directly coupled to the rotor 110 by the shaft 125 without changing the numbers of revolutions. In this case the wind turbine is a so caller Direct Drive (DD) wind turbine.

Further, a brake 126 is provided in order to stop the operation of the wind turbine 100 or to reduce the rotational speed of the rotor 110 for instance (a) in case of an emergency, (b) in case of too strong wind conditions which might harm the wind turbine 100, and/or (c) in case of an intentional saving of the consumed fatigue life time and/or the fatigue life time consumption rate of at least one structural component of the wind turbine 100.

The wind turbine 100 further comprises a control system 153 for operating the wind turbine 100 in a highly efficient manner. Apart from controlling for instance the yaw angle adjustment device 121 the depicted control system 153 is also used for adjusting the blade pitch angle of the rotor blades 114 in an optimized manner In accordance with basic principles of electrical engineering the generator 140 comprises a stator assembly 145 and a rotor assembly 150. The stator assembly 145 comprises a plurality of coils for generating electrical current in response to a time alternating magnetic flux. The rotor assembly 150 comprises a plurality of magnet component parts each comprising two different magnetic materials. The magnet component parts are arranged in rows being aligned with a longitudinal axis of the rotor assembly 150.

FIG. 2 shows an electromechanical transducer 240 comprising a stator assembly 245 and a rotor assembly 250. An air gap ag is provided between the stator assembly 245 and the rotor assembly 250. According to the embodiment described here the air gap ag is used for guiding a cooling fluid through the electromechanical transducer 240 in order to remove waste heat which during operation is generated by not depicted stator coils of the stator assembly 145.

A plurality of magnet assemblies 270 is mounted to the support structure 260. The magnet assemblies 270 are arranged in a matrix like structure around a curved surface area of the support structure 260 having a basically cylindrical geometry. In FIG. 2 for the sake of clarity only two of the magnet assemblies 270 are depicted.

Each magnet assembly 270 comprises a magnet component 272 which is made from a permanent magnet material 272. According to the embodiment described here the permanent magnet material is a material composition comprising a rare earth metal such as e.g. dysprosium.

As seen be seen from FIG. 2, the magnet components 272 are spaced apart from each other such that a free space between the two neighboring magnet components 272 is provided. In order to protect the permanent magnet material 272 from heat a thermal insulation structure 274 is provided, which covers a part of the surface of each magnet component 272. In order not to decrease the air gap ag the thermal insulation structure 274 is spatially limited to the above mentioned free space in between the two magnet components 272.

Spatially limiting the thermal insulation structure 274 to the free space between neighboring magnet components 272 seems to be a good compromise between (a) a good thermal insulation and (b) a low flow resistance of the air gap ag such that despite of the existence of the thermal insulation structure 274 a cooling fluid can flow along the air gap ag in an unimpeded manner.

According to the embodiment described here the thermal insulation structure comprises a thermal insulation material 274. The thermal insulation material 274 may be any material which provides a good thermal insulation between a heated up cooling fluid traveling along the air gap ag and the permanent magnet material 272. The thermal insulation material 274 may comprise for instance a polyurethane foam, a phenol foam, a mineral wool, a glass wool, a silica lime sand brick and/or clay.

FIG. 3 shows an electromechanical transducer 340 comprising a rotor assembly 350 with a plurality of magnet assemblies 370 each being realized as a modular unit comprising a magnet component 272 and a thermal insulation material 374. Again, only two magnet assemblies 370 are depicted in FIG. 3.

By contrast to the embodiment shown in FIG. 2, each magnet assembly 370 comprises not only one magnet component 272 but also one thermal insulation structure 374. In other words, each modular magnet assembly 370 comprises its own thermal insulation structure 374. This may provide the benefit that during assembling the rotor assembly 350 the thermal insulation structure 374 can be attached to the respective magnet component 272 before mounting the same to the support structure 260.

As can be seen from FIG. 3, in order to facilitate a corresponding mounting procedure each magnet assembly 370 is arranged at a back plate 362, which can be easily mounted to the support structure 260 for instance by means of dove tail connection. Alternatively, also a T-shaped slot structure may be employed for mounting the back plates 362 to the support structure 260.

FIG. 4 shows a rotor assembly 450 being equipped with modular magnet assemblies 470. Each modular magnet assembly 470 comprises an enclosure 476. In the embodiment shown here the enclosure is arranged between the permanent magnet material 272 and the thermal insulation material 374.

FIG. 5 shows a rotor assembly 550 being equipped with modular magnet assemblies 570. Each modular magnet assembly 570 comprises an enclosure 576 which surrounds both the permanent magnet material 272 and the thermal insulation material 374.

FIG. 6 shows a rotor assembly 650 being equipped with modular magnet assemblies 670. Each modular magnet assembly 670 comprises an enclosure 576. By contrast to the embodiment shown in FIG. 6 a space between the enclosure 576 and the surface of the magnet component 272 is not filled with a thermal insulation material. In the embodiment shown in FIG. 6, this space is a free space 678 comprising a vacuum or at least a negative pressure.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A magnet assembly for a rotor assembly of an electromechanical transducer, the magnet assembly comprising:
    a magnet component comprising a permanent magnet material, wherein the magnet component is mounted to a base element,
    a thermal insulation structure covering at least a part of a surface of the magnet component for thermally decoupling the magnet component from heat being generated within electromechanical transducer;
    wherein the thermal insulation structure comprises a thermal insulating material and an enclosure structure, wherein the thermal insulating material surrounds the magnet component except where the magnet component is mounted to the base element and spatially separates the magnet component from the enclosure structure along an entire surface of the magnet component not mounted to the base element, and
    wherein the enclosure structure encloses both the magnet component and the thermal insulating material not mounted to the base element.

2. The magnet assembly according to claim 1, wherein the base element, comprises:
    a front surface being attached to the magnet component surface, and
    a back surface for mounting the magnet assembly to a support structure of the rotor assembly.

3. A rotor assembly for an electromechanical transducer, the rotor assembly comprising:
    a support structure,
    at least one magnet assembly as set forth in claim 2,
    wherein the back surface of the at least one magnet assembly is mounted to the support structure.

4. The rotor assembly according to claim 3, further comprising:
    at least one further magnet assembly,
    wherein the magnet assembly and the further magnet assembly are mounted next to each other at the support structure,
    wherein the thermal insulation structure is a common thermal insulation structure both for the magnet assembly and the further magnet assembly, and
    wherein the thermal insulation structure is located exclusively in between a space between the magnet assembly and the further magnet assembly.

5. An electromechanical transducer, comprising
    a stator assembly, and
    a rotor assembly as set forth in claim 3.

6. The electromechanical transducer of claim 5, wherein the electromechanical transducer is the generator of a wind turbine.

7. The magnet assembly according to claim 1, wherein the thermal insulating structure comprises a sandwich structure of at least one layer of a thermal insulating material and at least one layer of a thermal radiation reflecting material.

8. The magnet assembly according to claim 1, wherein the thermal insulating material is a porous material.

9. The magnet assembly according to claim 8, wherein the thermal insulating material comprises at least one of the group consisting of polyurethane foam, phenol foam, aerogel, mineral wool, glass wool, silica lime sand brick and clay.

10. The magnet assembly according to claim 1, wherein between the enclosure structure and the magnet component there is formed a free space.

* * * * *